Figure 1:
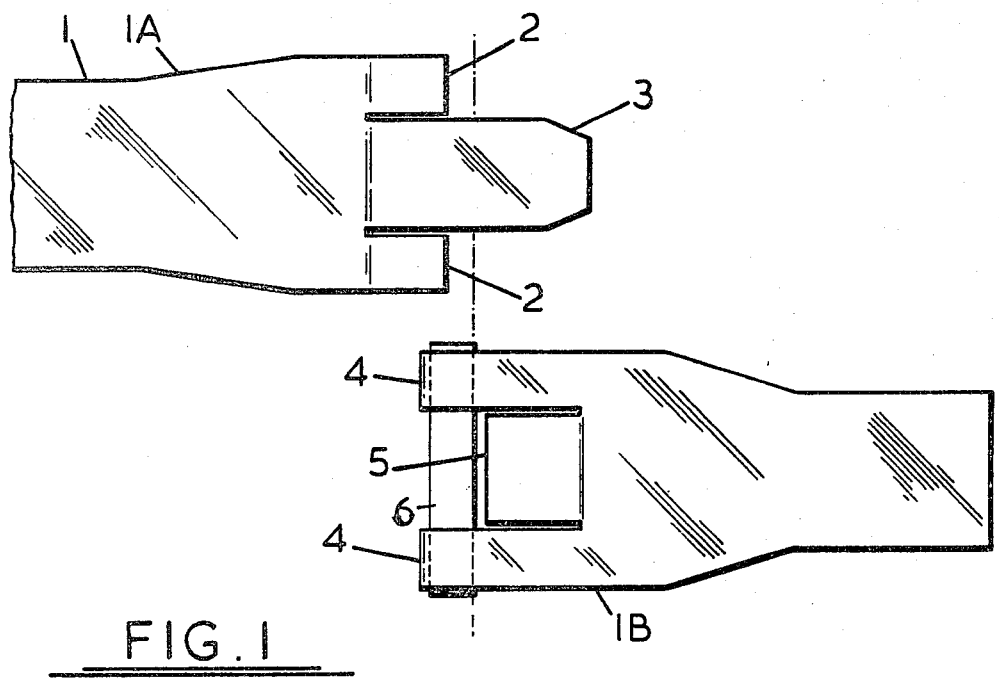

United States Patent [19]

Speirs et al.

[11] 4,367,571
[45] Jan. 11, 1983

[54] ADJUSTABLE CLAMP FOR FASTENING AROUND A TUBULAR OR LIKE OBJECT

[75] Inventors: Graeme K. Speirs; Anthony D. Cameron, both of Aberdeen, Scotland

[73] Assignee: Webco Industrial Rubber Limited, Aberdeen, Scotland

[21] Appl. No.: 128,356

[22] Filed: Mar. 7, 1980

[51] Int. Cl.³ .............................................. A44B 21/00
[52] U.S. Cl. .............................. 24/249 R; 24/20 EE; 248/231
[58] Field of Search ......... 24/249 R, 249 DP, 23 EE, 24/20 R, 20 EE; 248/231

[56] References Cited

U.S. PATENT DOCUMENTS

| 312,406 | 2/1885 | Towle, Jr. | 24/20 EE X |
| 881,053 | 3/1908 | Brigance | 24/20 EE |
| 1,177,500 | 3/1916 | Dolson | 24/20 R X |
| 1,765,151 | 6/1930 | Hansen | 24/249 R X |
| 2,824,613 | 2/1958 | Baker et al. | 24/263 D X |
| 3,893,647 | 7/1975 | Kennedy | 248/231 X |

FOREIGN PATENT DOCUMENTS 449551  6/1936  United Kingdom ............ 24/20 EE

Primary Examiner—Roy D. Frazier
Assistant Examiner—Peter A. Aschenbrenner
Attorney, Agent, or Firm—Larson and Taylor

[57] ABSTRACT

The clamp of the invention comprises a strip of flexible material formed at the ends with tongues which can be engaged with one another when the clamp is fitted around a tubular or bar-like object. One end is formed with at least one set of three tongues consisting of a short tongue flanked by two long tongues the tips of the long tongues being bridged by a fixed bar and the other end is formed with at least one tongue engageable over the bar and under the short tongue of the tongues of the other end. The strip of flexible material may consist of two portions hinged to one another.

4 Claims, 8 Drawing Figures

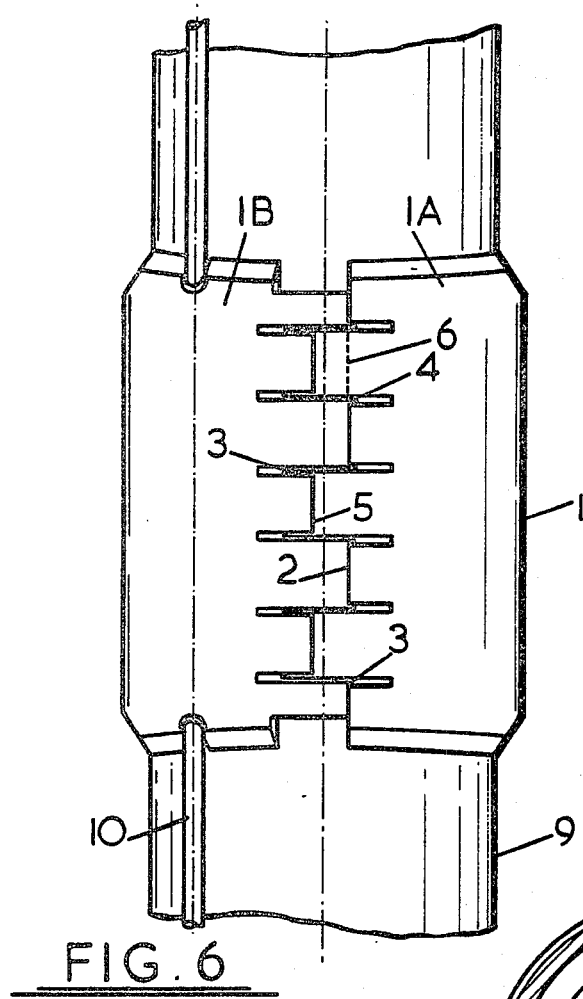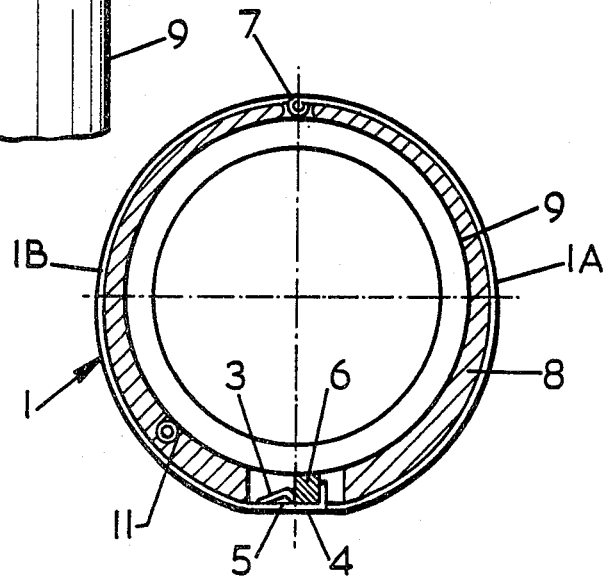

ADJUSTABLE CLAMP FOR FASTENING AROUND A TUBULAR OR LIKE OBJECT

The subject of this invention is an adjustable clamp for fitting around a tubular or bar-like object. One of the most common requirements in engineering and building work is to clamp an object to a bar. In this connection one of the most severe applications for such a clamp is in an oil or gas well and the clamp of the present invention is of particular use in such an application. It is, however, also applicable in other more common situations such as clamping a rubber hose to the end of a rigid pipe and clamping a bracket or other object to a supporting rod or column.

Many clamping devices for fitting around tubular or like objects are known. The most effective tend, however, to be more or less complicated and many require the use of several discrete parts which have to be fitted to one another before the clamp is applied to the object or require the use of auxiliary parts such as locking pins, or have to be assembled to provide the clamping action. Also some known clamps make use of parts which require to be machined. It is an object of the present invention to provide an improved clamp which comprises only one part, which is easy and cheap to manufacture, provides stepless adjustment and thus accommodates variations in tubing diameter falling within the normal manufacturing tolerances and is easily fitted.

A clamp according to the invention comprises a strip of flexible material one end of which is formed with at least one tongue projecting longitudinally of the strip and the other end of which is formed with at least one set of three separate parallel tongues projecting longitudinally of the strip and consisting of a short tongue flanked by two long tongues which project beyond the short tongue, and a rigid bar bridging said two long tongues at their tips and being fixed to the two long tongues only, the tongue at said one end of the strip being in line with the short tongue of the set of three tongues at said other end of the strip and being narrower than the distance between the long tongues of said set of three tongues.

The lengths of the tongues may be such that the bar is clear of the tip of the short tongue.

The tongue at said one end of the strip may be the centre tongue of a set of three separate parallel tongues projecting longitudinally of the strip, said centre tongue constituting a long tongue flanked by two short tongues so that the long tongue projects beyond the short tongues.

Said other end of the strip may be formed with several sets of three tongues and some of the tongues may be common to two sets of three tongues, said one end of the strip being formed with one tongue for each set of three tongues at the other end, each tongue being opposite the short tongue of a corresponding set of three at the other end. Alternatively said one end may be formed with a number of sets of three tongues the same as the number of sets of three tongues at said other end, each set of tongues at said one end comprising a long tongue flanked by two short tongues, each said long tongue being in line with the short tongue of the corresponding set at said other end.

As an example of how some tongues may be common to two sets it is explained that the strip may be formed at said other end with an odd number of tongues greater than three of which counting from one longitudinal edge of the strip the odd numbered tongues are long tongues and the even numbered tongues are short tongues while said one end of the strip is formed with a number of tongues equal to and in line with said odd number tongues at said other end of the strip, each odd numbered tongue at said other end of the strip other than the first and the last being common to sets of three tongues including the two tongues earlier in the series and the two tongues later in the series.

Said one end of the strip may be formed with a number of tongues equal to the number of tongues at said other end of the strip, of the tongues at said one end of the strip the odd numbered tongues are short tongues and the even numbered tongues are long tongues, each tongue at said one end of the strip being in line with the tongue of the same number at said other end of the strip when numbered from the same longitudinal edge of the strip.

The strip may be formed at said other end with several sets of tongues arranged in groups spaced from one another widthwise of the strip, said one end then being formed with either single tongues each in line with a corresponding short tongue at said other end or with several sets of three tongues also spaced from one another widthwise of the strip with the short tongues at one end of the strip in line with corresponding long tongues at the other end of the strip.

The strip may be formed of two portions hinged to one another to be swingable relatively to one another about an axis transverse to the length of the strip, the two portions of the strip being curved to the same radius and preferably subtending equal angles of arc.

The strip may carry a lining of resilient material. In a clamp to be used with the production tubing of an oil or a gas well to support at least one control line or cable the lining may be formed with a groove disposed transversely of the strip to accommodate the control line within the confines of the clamp while maintaining the clamp concentric with the production tubing.

The strip may also carry an external sleeve preferably of resilient material and of a diameter to fit within the casing which will contain the production tubing and the control line. The external sleeve may be plain or may be formed with outwardly projecting flutes the overall diameter of which is such as to allow the clamp to slide smoothly in the casing. In this construction the clamp is capable of acting as a centralizer when fitted to production tubing as the production tubing is advanced into the casing. The lining then grips the production tubing so that the clamp becomes fixed on the production tubing and moves along the casing with the tubing string, the sleeve slipping along the inner surface of the casing. The production tubing is thus maintained approximately central in the casing and is prevented from being damaged by running against the casing. Where the sleeve is fluted the fluid can circulate freely within the casing by passing between the flutes.

Figure 2:
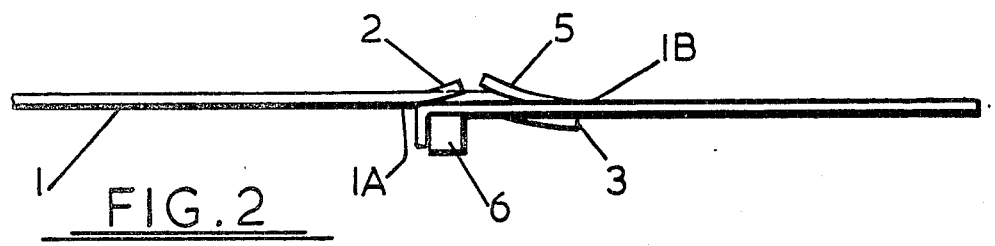
Figure 3:
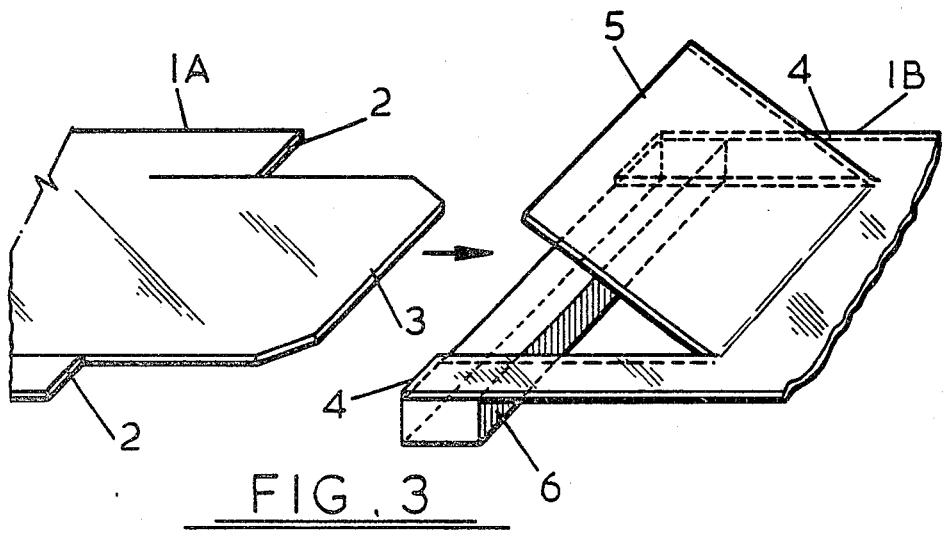
Figure 4:
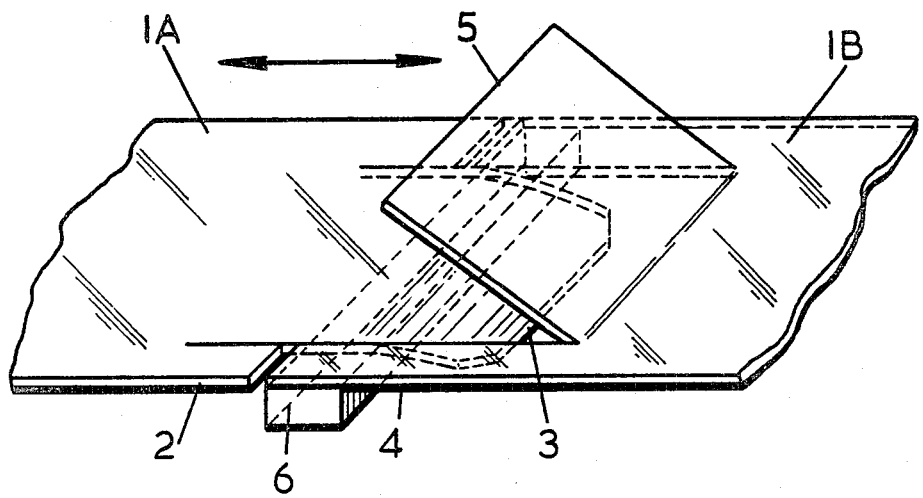
Figure 5:
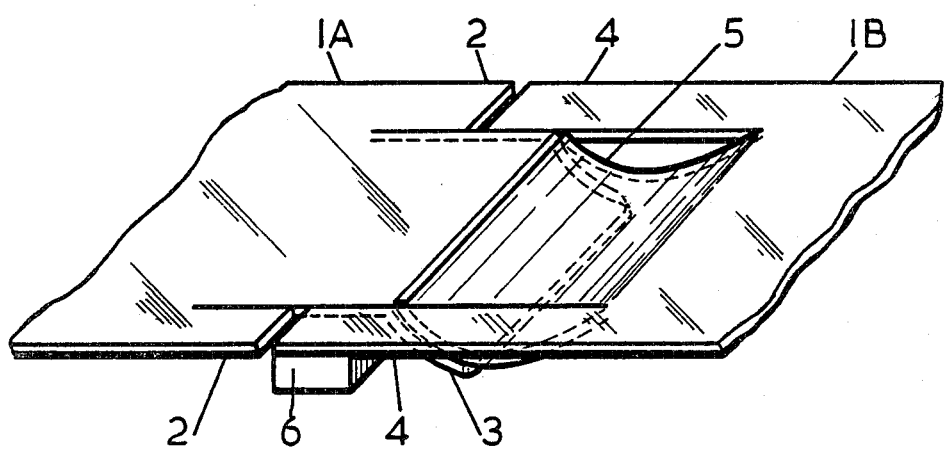
Figure 8:
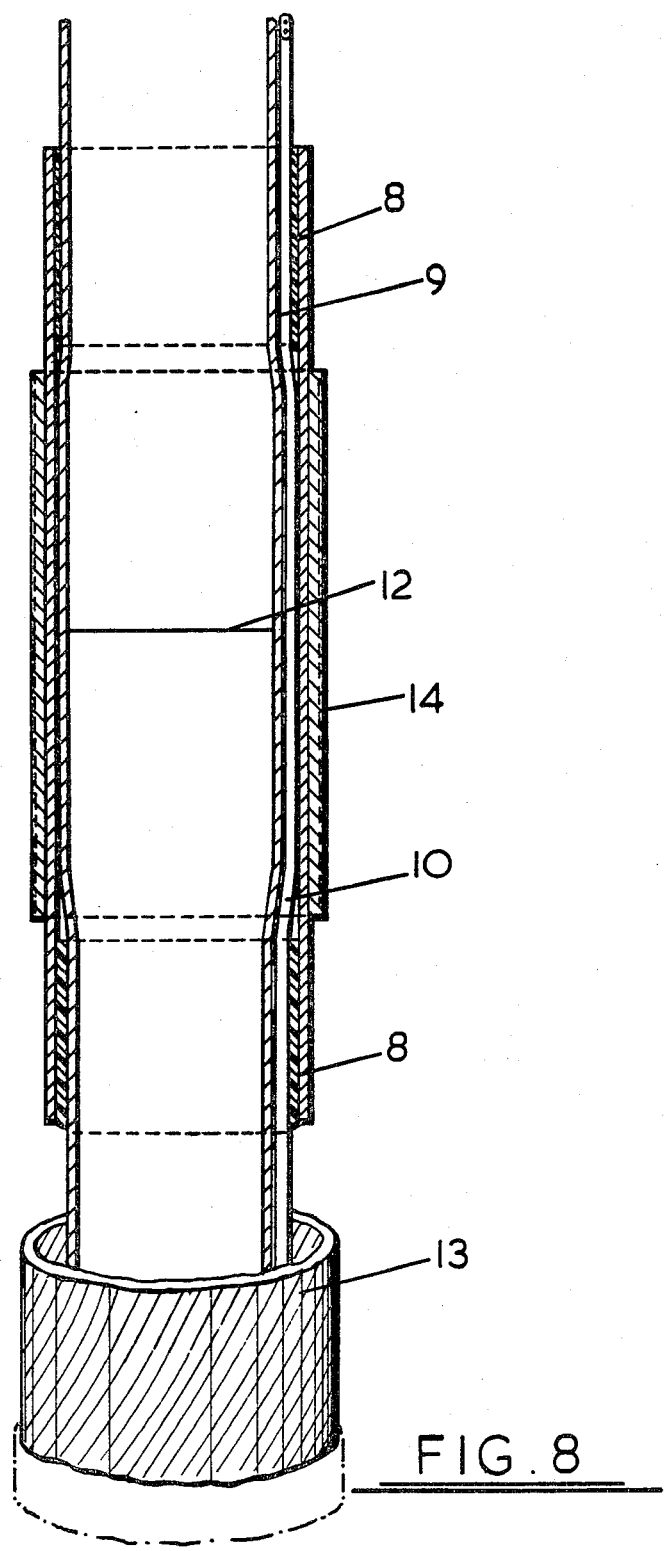

Practical embodiments of the invention are illustrated in the accompanying drawings in which FIG. 1 illustrates the two ends of a strip forming a clamp, FIG. 2 is a side view showing how the ends are engaged with one another, FIGS. 3, 4 and 5 show the action of closing the clamp, FIG. 6 illustrates an example of one form of clamp fitted to a length of production tubing, FIG. 7 is a section through the line 7—7 in FIG. 6 and FIG. 8 shows another form of the clamp in use to hold the control lines of an oil or gas well to the production tubing, this form of clamp being arranged to fit over an upset joint in the production tubing.

In the drawings 1 denotes a strip of flexible material one end 1A of which is formed with a set of three tongues of which the tongues 2 are short tongues and the tongue 3 is a long tongue projecting beyond the short tongues 2, the tongues projecting in the direction of the length of the strip 1, and 1B denotes the other end of the strip 1, this end being formed with another set of tongues of which the tongues 4 are long tongues flanking a short tongue 6. The tips of the long tongues 4 are bridged by a rigid bar 6 fastened to the tongues.

In FIGS. 6 and 7 the strip 1 is formed of two portions hinged to one another at 7 and is formed with seven tongues at end end forming three sets of tongues at each end. It is also provided with a resilient lining 8. The clamp is shown embracing a length of production tubing 9 and with the tongues engaged with one another in the manner illustrated in FIGS. 3, 4 and 5. 10 denotes a control line lying close against the surface of the production tubing. The lining 8 is formed with a groove 11 to accommodate the control line 10. In FIG. 8 in which the clamp is shown fitting over an upset joint 12 in the production tubing 9 the control line 10 passes down the outside of the production tubing 9 within a borehole casing 13. In this construction the lining 8 is in two sections each at a respective end of the strip 1 forming the casing of the clamp, and the tongues on the strip may be arranged in two spaced groups one at each end of the clamp. 14 denotes an externally fluted sleeve fitting over the clamp, the sleeve serving to hold the clamp out of contact with the inner surface of the casing 13.

In practice, the clamp is closed by encircling the cylindrical object by the strip 1 then inserting the long tongue 3 of one end over the bar 6 and under the short tongue 5 of the other end which may be bent upwards first (see FIGS. 3 and 4). The short tongue 5 is then pressed down on top of the long tongue 3 as illustrated in FIG. 2 causing the long tongue 3 to bend over the inner edge of the bar 5 at a sharp angle such that a tensile pull on the strip cannot cause the bent strip to come up over the bar 6 against the short tongue 5.

It was mentioned earlier in the specification that an important application of the present clamping device is to secure the control lines to the production tubing during the completion stage of an oil well. The problems associated with this are as follows:

It is necessary to control the flow of gas or oil through the production tubing of a gas or an oil well but it is customary to provide for this purpose subsurface valves located at some distance down from the top of the well. In modern equipment such valves are arranged to be operated by fluid pressure. The control fluid is usually fed to the valves by control lines which pass down the well alongside the production tubing.

Difficulties have been met with in the use of such control lines. The lines must be in long lengths, as long as the depth of the distance down the well to the valve and if unsupported along their lengths they would tend to distort and deviate from their desired position alongside the production tubing. To prevent this various methods have been used to clamp them to the associated production tubing but this has caused its own difficulties. To prevent chafing it is necessary to clamp them at close intervals to the production tubing. This has caused difficulties in that as a result of high frictional forces on the clamps they tend to move along the production tubing. This can lead to further chafing and distortion of the control lines and damage to the clamps particularly at the upset joints on the production tubing.

In an endeavour to protect the control lines from damage resulting from corrosion and chafing during installation and withdrawal it has been proposed to encapsulate the lines in elastomeric material.

How effective the clamp of the present invention is can be seen by reference to FIG. 8 of the accompanying drawings. It will be seen there that the control line 10 although having to be bent outwardly to pass over the upset portion 12 of the production tubing 9 is safely held to the production tubing by the clamp of the invention without causing high friction against the control line because at the upset portion 12 of the production tubing the clamp is clear of the control line and comes against it by way of the resilient lining only at both ends.

The clamp illustrated in FIG. 8 is a special clamp specifically intended for use at an upset joint in the production tubing. In many cases, however, it will be quite adequate to use two short clamps one above and one below the upset portion 12 of the production tubing. Each short clamp will be about the same length as one of the portions of the clamp illustrated as furnished with a section of resilient lining 8.

What is claimed is:

1. A clamp for fitting around a tubular or bar-like object comprising a strip of flexible material one end of which is formed with a number of sets of three parallel tongues projecting longitudinally of the strip and the other end of which is formed with an equal number of sets of three separate parallel tongues also projecting longitudinally of the strip, each set of tongues at said one end consisting of a short tongue flanked by two long tongues which project beyond the short tongue and each set of tongues at said other end consisting of a long tongue flanked by two short tongues and a rigid bar bridging at their tips the two long tongues of each set of two long tongues flanking a short tongue, the rigid bar being located beyond the tip of the short tongue and being fixed to the two long tongues only, each long tongue at said one end of the strip being in line with a short tongue at said other end of the strip and being narrower than the distance between the long tongues flanking the short tongue.

2. A clamp as claimed in claim 1 in which said other end of the strip is formed with an odd number of tongues greater than three of which counting from one longitudinal edge of the strip the odd numbered tongues are long tongues and the even numbered tongues are short tongues while said one end of the strip is formed with a number of tongues equal to and in line with said odd numbered tongues at said other end of the strip, each odd numbered tongue at said other end of the strip other than the first and the last being common to sets of three tongues including the two tongues earlier in the series and the two tongues later in the series.

3. A clamp as claimed in claim 1 in which said one end of the strip is formed with a number of tongues equal to the number of tongues at said other end of the strip, of the tongues at said one end of the strip the odd numbered tongues are short tongues and the even numbered tongues are long tongues, each tongue at said one end of the strip being in line with the tongue of the said number at said other end of the strip when numbered from the same longitudinal edge of the strip.

4. A clamp as claimed in claim 1 in which the strip is formed of two portions hinged to one another to be swingable relatively to one another about an axis transverse to the length of the strip, the two portions of the strip being curved to the same radius.

* * * * *